(12) United States Patent
Andrizzi et al.

(10) Patent No.: US 10,922,743 B1
(45) Date of Patent: Feb. 16, 2021

(54) ADAPTIVE PERFORMANCE OF ACTIONS ASSOCIATED WITH CUSTOM USER INTERFACE CONTROLS

(71) Applicant: Amazon Technologies, Inc., Seattle, WA (US)

(72) Inventors: Stephan Josef Andrizzi, San Francisco, CA (US); Jai Prakash Chabria, Seattle, WA (US); Nicole Dare, Shoreline, WA (US); Kenneth DeLand, Issaquah, WA (US); Nirav Praful Desai, Sammamish, WA (US); Anindya Guha, Seattle, WA (US); Marc Hensley, Seattle, WA (US); Douglas James Herrington, Seattle, WA (US); Samuel Stevens Heyworth, Seattle, WA (US); Apoorva Iyer, Bellevue, WA (US); Nitish Kumar, Seattle, WA (US); Hannah McClellan Richards, Seattle, WA (US); Amir Pelleg, Seattle, WA (US); Jessica Protasio, Seattle, WA (US); Daniel Benjamin Rausch, Seattle, WA (US); Laura Allison Ridlehoover, Seattle, WA (US); Jeffrey Rosenberg, Seattle, WA (US); Paul Warren Smart, Seattle, WA (US); Amirali Virani, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 505 days.

(21) Appl. No.: 15/398,473

(22) Filed: Jan. 4, 2017

(51) Int. Cl.
*G06Q 30/06* (2012.01)
*G06F 3/0481* (2013.01)

(52) U.S. Cl.
CPC ....... *G06Q 30/0641* (2013.01); *G06F 3/0481* (2013.01); *G06Q 30/0633* (2013.01)

(58) Field of Classification Search
CPC .......... G06Q 30/0641; G06Q 30/0633; G06Q 20/201; G06Q 30/06; G06F 3/0481; G06F 3/04847
See application file for complete search history.

(56) References Cited

U.S. PATENT DOCUMENTS

| 5,592,378 A | 1/1997 | Cameron et al. |
| 5,960,411 A | 9/1999 | Hartman et al. |

(Continued)

FOREIGN PATENT DOCUMENTS

| EP | 2746926 A2 | 6/2014 |
| WO | WO 2009/142768 A1 | 11/2009 |

OTHER PUBLICATIONS

Introducing Your Dash Buttons: Shortcuts to shop your favorite products, by amazon.com, dated Jan. 20, 2017, https://www.youtube.com/watch?time_continue=2&v=wllrQgXa6pY.

(Continued)

*Primary Examiner* — Florian M Zeender
*Assistant Examiner* — Vanessa Deligi
(74) *Attorney, Agent, or Firm* — Knobbe Martens Olson & Bear, LLP

(57) ABSTRACT

Systems, methods, and computer-readable media are described for performing actions based on user activation of custom user interface ("UI") controls. A user of a networked computing service may activate a custom UI control by selecting the custom UI control (such as by touching the custom UI control displayed on a touchscreen display) to trigger the networked computing service to perform a predefined action associated with the custom UI control. In the event that the predefined action cannot be performed, the (Continued)

US 10,922,743 B1

Page 2 networked computing service may identify an alternative action that may be performed instead of the predefined action, optionally request user confirmation of the alternative action, and perform the alternative action.

15 Claims, 9 Drawing Sheets

(56) References Cited

U.S. PATENT DOCUMENTS

| | | |
|---|---|---|
| 6,014,638 A | 1/2000 | Burge et al. |
| 6,115,717 A | 9/2000 | Mehrotra et al. |
| D445,426 S | 7/2001 | Wang |
| 6,731,309 B1 | 5/2004 | Unbedacht et al. |
| 7,016,865 B1 | 3/2006 | Weber et al. |
| 7,127,414 B1 | 10/2006 | Awadallah et al. |
| 7,203,675 B1 | 4/2007 | Papierniak et al. |
| D550,689 S | 9/2007 | Vigesaa |
| 7,266,514 B2 | 9/2007 | Herbert et al. |
| 7,331,038 B1 | 2/2008 | Snodgrass et al. |
| 7,460,735 B1 | 12/2008 | Rowley et al. |
| D585,453 S | 1/2009 | Chen et al. |
| D598,027 S | 8/2009 | Carpenter et al. |
| D616,457 S | 5/2010 | Carpenter et al. |
| D625,312 S | 10/2010 | Jewitt et al. |
| 7,827,157 B2 | 11/2010 | Shilo et al. |
| 7,856,380 B1 | 12/2010 | Latin-Stoermer et al. |
| 7,886,011 B2 | 2/2011 | Buchheit |
| D637,201 S | 5/2011 | Wasko et al. |
| 7,945,484 B1 | 5/2011 | Tam et al. |
| D644,662 S | 9/2011 | Gardner et al. |
| D644,663 S | 9/2011 | Gardner et al. |
| 8,090,626 B1 * | 1/2012 | Wijaya ............... G06Q 30/0631 |
| | | 705/26.8 |
| D654,925 S | 2/2012 | Nishizawa et al. |
| D660,313 S | 5/2012 | Williams |
| D665,422 S | 8/2012 | Morrow et al. |
| D667,451 S | 9/2012 | Wujcik et al. |
| D677,275 S | 3/2013 | Wujcik et al. |
| D677,681 S | 3/2013 | Kaufthal et al. |
| 8,417,357 B2 | 4/2013 | Husoy et al. |
| 8,519,971 B1 | 8/2013 | Mackraz |
| D696,263 S | 12/2013 | Ray et al. |
| D706,291 S | 6/2014 | Yang et al. |
| D711,895 S | 8/2014 | Inose et al. |
| 8,856,958 B1 | 10/2014 | Kosslyn et al. |
| 8,898,573 B2 | 11/2014 | Chang et al. |
| 8,959,476 B2 | 2/2015 | Ramani et al. |
| D726,214 S | 4/2015 | Wantland et al. |
| D727,960 S | 4/2015 | Chaudhri et al. |
| 9,003,295 B2 | 4/2015 | Baschy |
| 9,003,296 B2 | 4/2015 | Murthy et al. |
| D746,832 S | 1/2016 | Pearcy et al. |
| D750,125 S | 2/2016 | Yang et al. |
| D754,728 S | 4/2016 | Akana et al. |
| D756,379 S | 5/2016 | Apodaca et al. |
| D757,039 S | 5/2016 | Yang et al. |
| D760,277 S | 6/2016 | Park |
| D760,746 S | 7/2016 | Dellinger et al. |
| D763,308 S | 8/2016 | Wang et al. |
| D763,896 S | 8/2016 | Chaudhri |
| D764,520 S | 8/2016 | Lee et al. |
| D765,705 S | 9/2016 | Jewitt et al. |
| D766,278 S | 9/2016 | Andre et al. |
| D769,891 S | 10/2016 | Cho |
| D771,116 S | 11/2016 | Dellinger et al. |
| D776,124 S | 1/2017 | Lee et al. |
| D777,182 S | 1/2017 | Holm et al. |
| D777,183 S | 1/2017 | Chevrier et al. |
| D780,192 S | 2/2017 | Chu et al. |
| 9,563,877 B2 | 2/2017 | Macbeth et al. |
| D784,397 S | 4/2017 | Kim et al. |
| D786,917 S | 5/2017 | Hong et al. |
| D786,918 S | 5/2017 | Kim et al. |
| D789,956 S | 6/2017 | Ortega et al. |
| D791,149 S | 7/2017 | Chaudhri et al. |
| D791,786 S | 7/2017 | Chaudhri et al. |
| D794,057 S | 8/2017 | Ekstrand et al. |
| D796,542 S | 9/2017 | Bhatti et al. |
| D797,798 S | 9/2017 | Sato et al. |
| 9,779,457 B1 | 10/2017 | Fisher et al. |
| D801,996 S | 11/2017 | Yang et al. |
| D801,999 S | 11/2017 | Hersh et al. |
| D802,607 S | 11/2017 | Apodaca et al. |
| D825,608 S | 8/2018 | Andrizzi et al. |
| D825,609 S | 8/2018 | Andrizzi et al. |
| D826,240 S | 8/2018 | Andrizzi et al. |
| D826,255 S | 8/2018 | Andrizzi et al. |
| 10,168,827 B2 | 1/2019 | Hinckley et al. |
| 10,198,707 B1 * | 2/2019 | Bolton ............. G06Q 10/08355 |
| 10,289,300 B2 | 5/2019 | Dare et al. |
| 10,296,195 B2 | 5/2019 | Andrizzi et al. |
| 10,409,480 B2 | 9/2019 | Dare et al. |
| 10,521,854 B1 | 12/2019 | Andrizzi et al. |
| 10,664,146 B2 | 5/2020 | Andrizzi et al. |
| 2004/0003406 A1 | 1/2004 | Billmaier |
| 2004/0143600 A1 | 7/2004 | Musgrove et al. |
| 2005/0071242 A1 | 3/2005 | Allen et al. |
| 2006/0010400 A1 | 1/2006 | Dehlin et al. |
| 2006/0293970 A1 | 12/2006 | Haynes et al. |
| 2007/0168391 A1 | 7/2007 | Coschigano et al. |
| 2007/0168517 A1 | 7/2007 | Weller |
| 2007/0171196 A1 | 7/2007 | Pfingsten |
| 2007/0192692 A1 | 8/2007 | Chen et al. |
| 2007/0203804 A1 * | 8/2007 | Kargman ........... G06Q 30/0635 |
| | | 705/26.81 |
| 2008/0136785 A1 | 6/2008 | Baudisch et al. |
| 2008/0154747 A1 | 6/2008 | Tarbell et al. |
| 2008/0177639 A1 | 7/2008 | Kuppersmith et al. |
| 2009/0006988 A1 | 1/2009 | Lu et al. |
| 2009/0007012 A1 | 1/2009 | Mandic et al. |
| 2009/0112474 A1 | 4/2009 | Chakrapani et al. |
| 2009/0237361 A1 | 9/2009 | Mosby et al. |
| 2010/0185989 A1 | 7/2010 | Shiplacoff et al. |
| 2010/0257479 A1 | 10/2010 | Do et al. |
| 2010/0332337 A1 | 12/2010 | Bullock |
| 2011/0018827 A1 | 1/2011 | Wang et al. |
| 2011/0141031 A1 | 6/2011 | McCullough et al. |
| 2011/0231224 A1 | 9/2011 | Winters |
| 2011/0231225 A1 | 9/2011 | Winters |
| 2012/0032979 A1 | 2/2012 | Blow et al. |
| 2012/0054671 A1 | 3/2012 | Thompson et al. |
| 2012/0278203 A1 | 11/2012 | Ojadidi |
| 2013/0073473 A1 * | 3/2013 | Heath ................ G06Q 30/06 |
| | | 705/319 |
| 2013/0271375 A1 | 10/2013 | Griffin et al. |
| 2013/0317938 A1 | 11/2013 | Zhao |
| 2014/0007012 A1 | 1/2014 | Govande et al. |
| 2014/0028701 A1 | 1/2014 | Eriksson et al. |
| 2014/0052571 A1 * | 2/2014 | Raman ................ G06Q 20/123 |
| | | 705/26.8 |
| 2014/0071060 A1 | 3/2014 | Santos-Gomez |
| 2014/0085202 A1 | 3/2014 | Hamalainen et al. |
| 2014/0157167 A1 | 6/2014 | Zhu |
| 2014/0249763 A1 | 9/2014 | Shimuta |
| 2014/0267437 A1 | 9/2014 | Mazzola |
| 2014/0282269 A1 | 9/2014 | Strutt et al. |
| 2015/0006314 A1 | 1/2015 | Goulart et al. |
| 2015/0084866 A1 | 3/2015 | Thomas et al. |
| 2015/0120761 A1 * | 4/2015 | Lounsbury .......... G06F 3/04842 |
| | | 707/751 |
| 2015/0193857 A1 | 7/2015 | Reed et al. |
| 2015/0253885 A1 | 9/2015 | Kagan et al. |
| 2015/0277681 A1 * | 10/2015 | Isaacson ............. G06F 3/0484 |
| | | 705/26.8 |
| 2015/0363035 A1 | 12/2015 | Hinckley et al. |
| 2016/0054791 A1 | 2/2016 | Mullins et al. |
| 2016/0109969 A1 | 4/2016 | Keating et al. |
| 2016/0117068 A1 | 4/2016 | Greenberg et al. |
| 2016/0139723 A1 | 5/2016 | Brett et al. |
| 2016/0239885 A1 * | 8/2016 | Goolsby ............ G06Q 30/0635 |
| 2016/0378334 A1 | 12/2016 | Liu et al. |
| 2017/0011337 A1 | 1/2017 | Matityaho |

(56) References Cited

U.S. PATENT DOCUMENTS

| | | |
|---|---|---|
| 2017/0061521 A1 | 3/2017 | Lee et al. |
| 2017/0083096 A1 | 3/2017 | Rihn et al. |
| 2017/0192626 A1* | 7/2017 | Virk .................... G06F 3/0482 |
| 2018/0060944 A1 | 3/2018 | Chefalas et al. |
| 2018/0088786 A1 | 3/2018 | Abzarian et al. |
| 2018/0157411 A1 | 6/2018 | Kim et al. |
| 2018/0173403 A1 | 6/2018 | Carbune et al. |
| 2018/0181293 A1 | 6/2018 | Dare et al. |
| 2018/0181294 A1 | 6/2018 | Dare et al. |
| 2018/0188933 A1 | 7/2018 | Andrizzi et al. |
| 2018/0188934 A1 | 7/2018 | Andrizzi et al. |
| 2018/0189786 A1* | 7/2018 | Poole .................... G06Q 20/00 |
| 2018/0247243 A1 | 8/2018 | Moolman et al. |
| 2018/0260107 A1 | 9/2018 | Dare et al. |
| 2018/0324048 A1 | 11/2018 | Lee |

OTHER PUBLICATIONS

Pixelmator Tip #7 Create and share your own custom Pixelmator shapes, by Pixelmator, dated Aug. 7, 2013, http://www.pixelmatortemplates.com/pixelmator-tip-7-create-and-share-your-own-customsshapes/, 3 pages.

Roberts, Emily, 'Introducing the Amazon Dash Button and Dash Replenishment Service,' Amazon 2 Appstore Biogs, dated Mar. 31, 2015, retrieved Oct. 25, 2016, available at https://developer.amazon.com/blogs/appstore/post/Tx3N3VXX052B1 Sl/introducing-the-amazon-dashbutton-and-dash-replenishment-service.

Office Action in Canadian Application No. 175656 dated Aug. 3, 2018.

International Search Report and Written Opinion in PCT/US2017/067826 dated Apr. 17, 2018.

International Search Report and Written Opinion in PCT/US2017/067422 dated Mar. 27, 2018.

International Search Report and Written Opinion in PCT/US2018/021160 dated May 28, 2018.

U.S. Appl. No. 10/720,712, filed Nov. 24, 2003, by Green, entitled "Deferred and Off-Loaded Rendering of Selected Portions of Web Pages to Incorporate Late-Arriving Service Data".

Endless.com, Endless Shoes & Handbags, http://www.endless.com . . . [accessed Jan. 1, 2009], copyright 2006-2009, 3 pages.

Quan et al., "A product-form aesthetic evaluation system", Computer-Aided Industrial Design and Conceptual Design, Nov. 2006, vol. CAIDCD '06, pp. 1-6, 17-19.

Website for Gap Inc.—http://www.gap.com—Screen shot captured Dec. 19, 2010.

International Preliminary Report on Patentability in 2017/067826 dated Jul. 9, 2019.

International Preliminary Report on Patentability in PCT/US2017/067422 dated Jul. 2, 2019.

International Preliminary Report on Patentability in PCT/US2018/021160 dated Sep. 17, 2019.

* cited by examiner

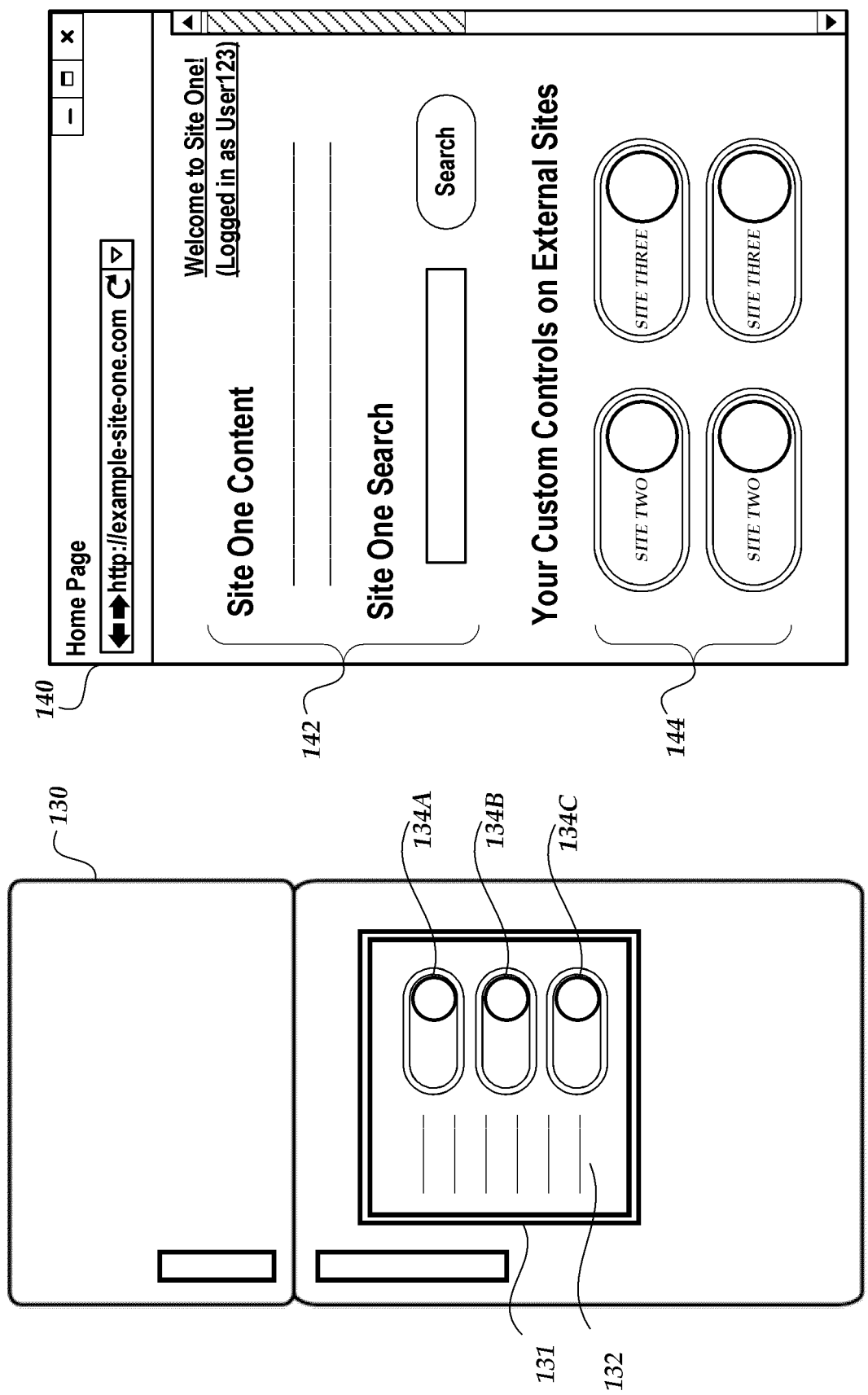

US 10,922,743 B1

ADAPTIVE PERFORMANCE OF ACTIONS ASSOCIATED WITH CUSTOM USER INTERFACE CONTROLS

BACKGROUND

Generally described, operators of computing services may provide user interfaces ("UIs") that enable users to browse and select the items made available through the service. A graphical user interface may provide hierarchical menus, search fields, and other controls to facilitate access, and may provide user-specific controls such as listings of recent orders or selectable item recommendations.

Users of computing services may thus perform various actions relating to the services by invoking various controls of the provided user interfaces. However, the functionality of the provided user interfaces may be limited by the service's inability to anticipate the user's actions, and these limitations of the user interfaces may reduce utilization of the computing services.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

FIGS. 1G and 1H are illustrative user interfaces that depict presentation of custom user interface controls on external systems.

DETAILED DESCRIPTION

Introduction

Figure 1A:
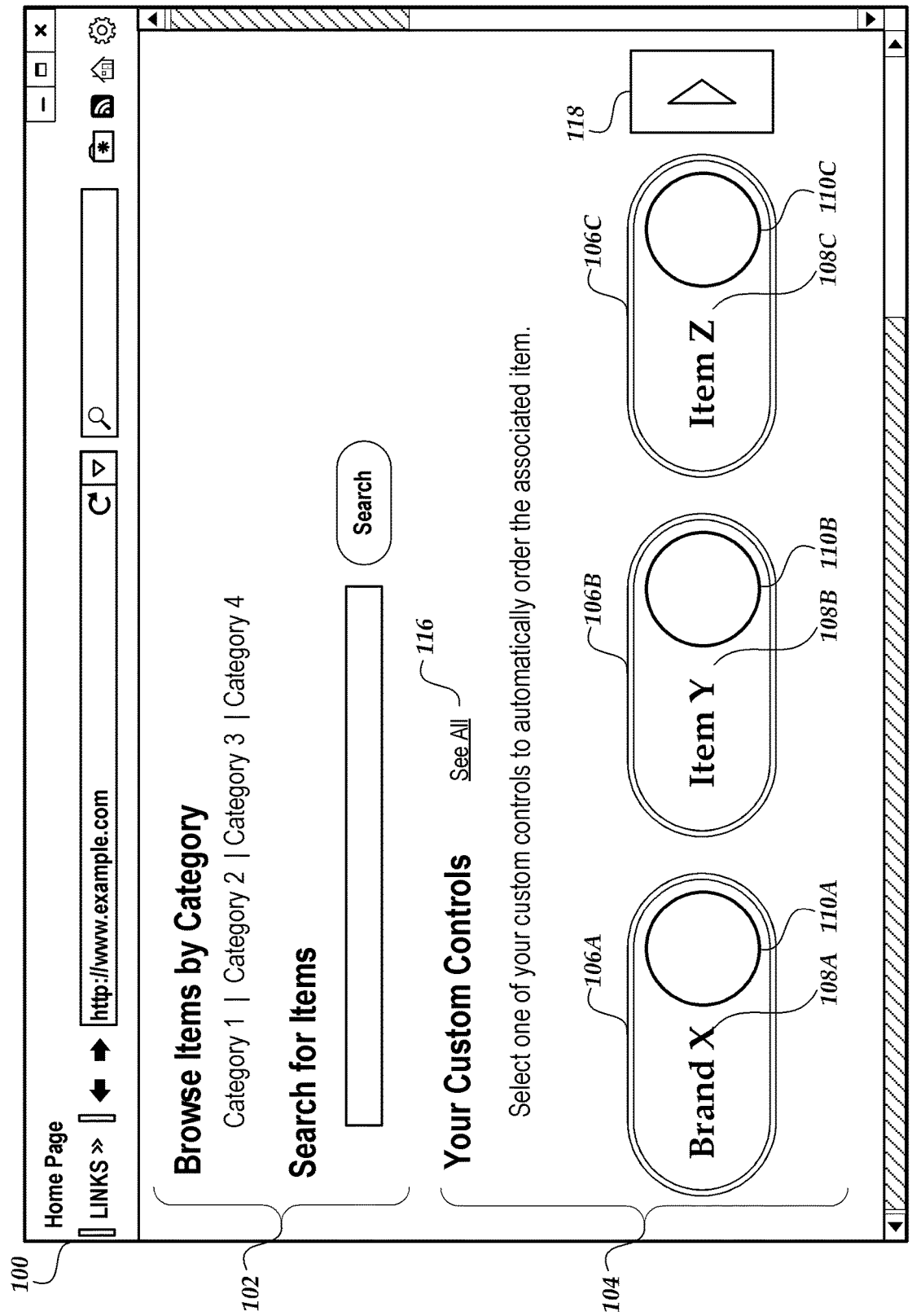
FIG. 1A is an illustrative user interface that depicts presentation of user-specific graphical user interface controls by a networked computing service.

Generally described, aspects of the present disclosure relate to user interfaces. More specifically, aspects of the present disclosure are directed to systems, methods, and computer-readable media related to displaying customized and user-specific graphical user interface controls according to a likelihood of their utilization by a given user. Illustratively, an operator of computing services may enable the generation of customized, user-specific graphical user interface controls. These custom controls may be generated, for example, by a process that detects recurring actions, such as a recurring purchase of a consumable product or service, or other actions that are frequently accessed and invoked via the user interface. In some embodiments, the computing service may present the user with an option to generate a custom user interface control to automate a recurring activity with respect to the given user, or to automate an activity that is likely to recur based on analyses of actions of the user and/or actions of other users of the service.

The computing service may present custom user interface controls as part of a more general user interface that enables access to a wider range of items or services. For example, the computing service may present a user interface with controls that enable a user to search for items available through the networked computing service, review a list of common items, navigate a hierarchy of items, and so forth. These controls may allow the user to perform a recurring activity, such as an item acquisition, but may require that the user repeatedly perform multiple interactions with the general user interface controls in order to complete the activity. Additionally, the user may repeat some activities on a regular but infrequent basis (once a year, as-needed, etc.), such that the interactions required to repeat the activity do not become familiar to the user. For example, in a traditional electronic catalog environment, if a given user orders a specific item on an infrequent basis, the user will typically navigate through multiple interfaces or pages (such as an initial search page to locate a listing for the item, or a page listing a number of past orders by the user to locate an order that includes the item) in order to eventually reach a page that includes a selectable option to place a new order for the item, at which point the user would typically provide additional order details.

The computing service described herein may present user interface controls that are customized for the activities of a particular user. These custom user interface controls (e.g., for performing user-specific actions such as placing an order for the user's favorite snack) may be presented in addition to the general user interface controls (e.g., for performing user-agnostic actions such as searching a database, navigating an electronic catalog, displaying item reviews, etc.). However, in some instances, performing one or more user-specific actions associated with a given custom user interface control may not be feasible or possible. For example, a custom user interface control configured to place an order for Item X upon user activation cannot cause Item X to be ordered if Item X is out of stock or has been discontinued. In other instances, the price of the item may have substantially increased since the creation of the custom user interface control. Thus, an improved method of performing user-specific actions based on user activation of custom user interface controls is desired.

Accordingly, embodiments of systems and methods described herein provide adaptive performance of actions based on user activation of custom user interface controls configured to trigger, upon activation, one or more actions to be performed. The systems and methods of the present disclosure may identify the most desirable action that can be performed upon user activation of the custom user interface controls, even if some of the designated actions cannot be performed in the manner contemplated by the user at the time such custom user interface controls were created.

As used herein, the term "action," in addition to having its ordinary meaning, is used to refer to an act (e.g., order, add to shopping cart, subscribe to, download, etc.) but not to the direct object of such act (e.g., item, file, membership, etc.). For example, when an item is ordered, the act of ordering may be the action and the item may be a parameter based on which the action is performed. The parameters of an action, as used herein, may refer to the direct object of an action (e.g., item, file, membership, etc.). Parameters may also include additional information, data, or attributes used to perform an action (e.g., shipping method, shipping address, payment method, etc.), which are sometimes also referred to herein as "action parameters." The term "parameter" may also include parameters associated with a custom user interface control (e.g., item price at the time of creation, item quantity, item type, etc.), which are sometimes also referred to herein as "control parameters." As used herein, the term "item," in addition to having its ordinary meaning, is used interchangeably to refer to an item itself (e.g., a particular product, service, or the like) and to its description or representation in a computer system. As will be apparent from the context in which it is used, the term "item" is also sometimes used herein to refer only to the item itself or only to its representation in the computer system. Further, not necessarily all advantages described herein are shared by every embodiment of this disclosure.

Custom User Interface Controls

FIG. 1A depicts an illustrative user interface 100 that implements aspects of the present disclosure. Although depicted as a web-based interface for purposes of illustration, the user interface 100 is not limited to a particular mode of presentation, and aspects of the present disclosure include presentation in any format described herein or otherwise known (e.g., including, but not limited to, via a web browser on a desktop or laptop computer, via a web browser or a mobile application on a smartphone or tablet computer, via a display screen of a third-party device). In the illustrated embodiment, the user interface 100 includes standard user interface controls 102, which may include category menus, search fields, or other user interface controls that enable the user to access content.

The user interface 100 further includes a custom control display region 104, which displays a number of custom user interface controls 106A-C. In some embodiments, each custom user interface control 106A-C includes an information panel 108A-C, which may display information such as a brand name, logo, or other information that identifies the action to be performed when the custom user interface control 106A-C is activated (or selected) by the user. In further embodiments, the information panel 108A-C may itself be activated and may display further information regarding the item and/or the action associated with the control 106A-C.

The custom user interface controls 106A-C may each further include a corresponding button 110A-C, which, when activated by the user, performs an action associated with the control 106A-C based on parameters association with the control. For example, the control 106A may be associated with the action and parameter pairing of placing an order for a "Brand X" item (e.g., previously designated but not identified on the control 106A), and activation of the button 110A by the user (such as by selecting the button using a cursor or by touching the button displayed on a touchscreen) may result in an order for the "Brand X" item being placed. While reference is made herein to the controls each including a button, it will be appreciated that, in other embodiments, an entire control (such as control 106A) may be selectable to perform the action associated with the control, without any button or sub-portion of the displayed control being present or separately selectable. Furthermore, the portion of a displayed control that is selectable in order to perform the associated action may have a variety of appearances, some of which may not resemble a button or be considered a button.

In certain embodiments, some custom user interface controls 106B-C may correspond to different items of the same brand. In such embodiments, the information panels 108B-C may respectively indicate the corresponding item of the same brand (e.g., "Item Y" and "Item Z"), thereby allowing the user to distinguish between the two controls 106B and 106C and to select the control associated with the desired action and/or parameters (such as ordering an "Item Y" or ordering "Item Z").

The user interface 100 may further include a selectable option 116 that may be selected by the user in order to view all of the custom user interface controls created for the user. The user interface 100 may also include a selectable option such as a scroll arrow 118, which may facilitate viewing of additional custom user interface controls.

Alternative Actions

Figure 1B:
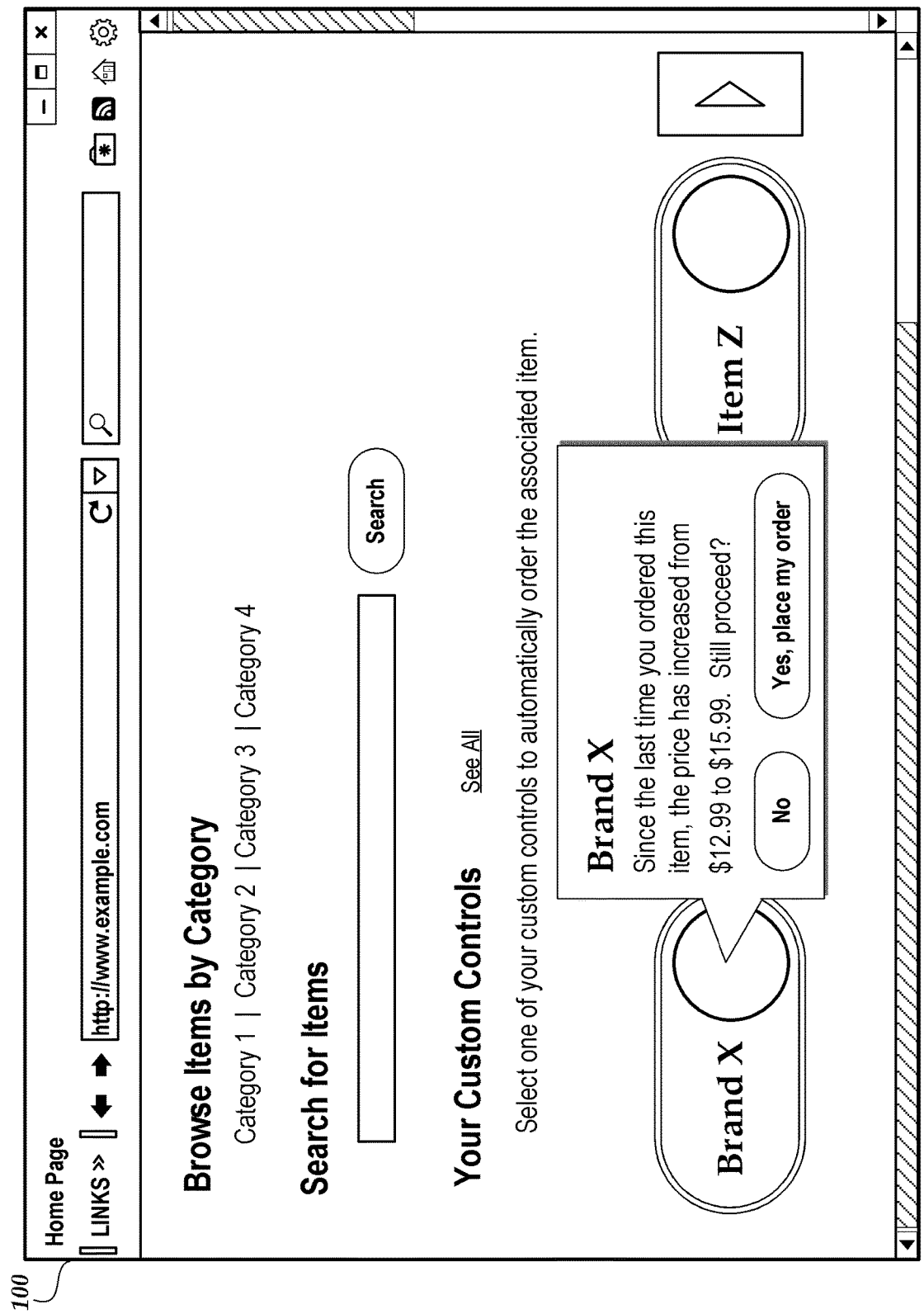
FIG. 1B is an illustrative user interface that depicts presentation of selectable options in the user interface of FIG. 1A.
Figure 1C:
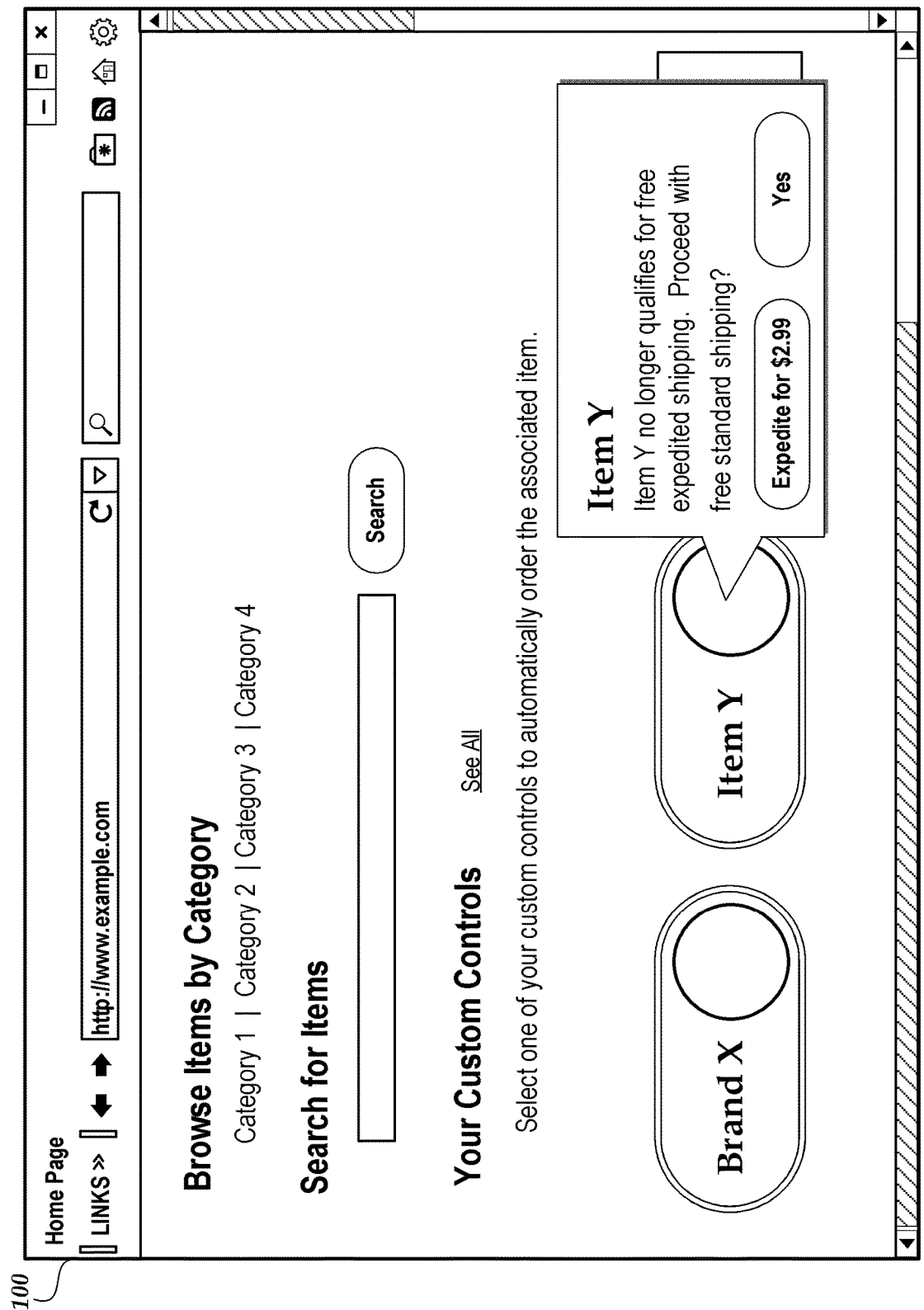
FIG. 1C is another illustrative user interface that depicts presentation of selectable options in the user interface of FIG. 1A.
Figure 1D:
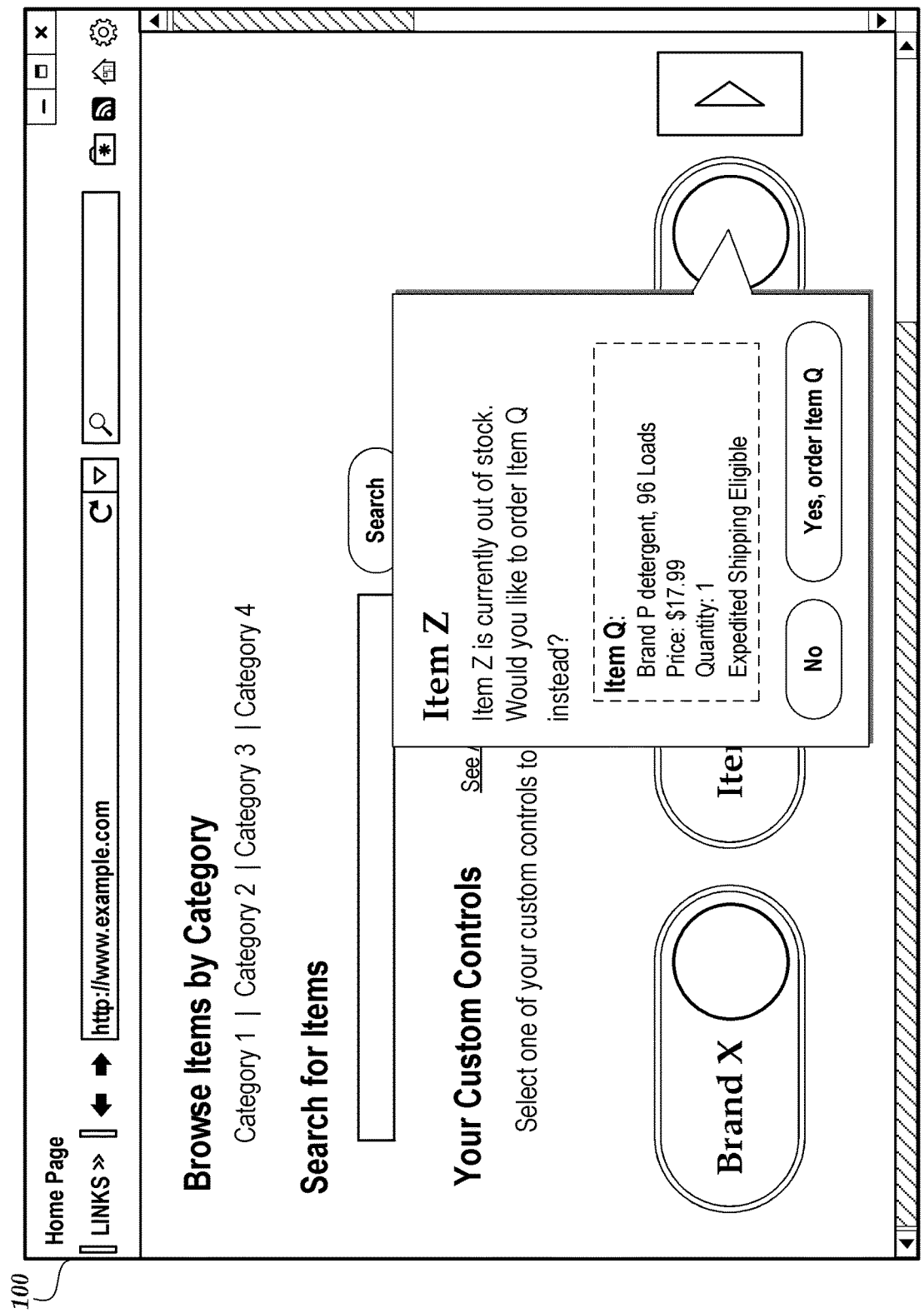
FIG. 1D is another illustrative user interface that depicts presentation of selectable options in the user interface of FIG. 1A.

With reference to FIGS. 1B-D, various scenarios in which alternative actions other than the action associated with the activated custom user interface control may be performed, or an action (e.g., the action associated with the activated custom user interface control or some other action) may be performed using different parameters than are associated with the activated custom user interface control. FIG. 1B depicts an example in which one or more parameters associated with the action associated with the activated control result in an action-and-parameter pairing that cannot be performed due to changed conditions (e.g., an "order" action for a given item having a price parameter of $10-$13 cannot be performed because the price of the item has risen). In the example of FIG. 1B, the price of the "Brand X" item has increased from $12.99 to $15.99. Upon determining that the price of the "Brand X" item has increased (or increased by at least a threshold amount), the system (e.g., the system providing the custom user interface controls illustrated in FIGS. 1A-D) may prompt the user to confirm that the increased price for the "Brand X" item is acceptable to the user. As shown in FIG. 1B, the user may be presented selectable options for either (i) canceling the request to complete the action associated with the control 106A or (ii) placing the order despite the increased price. In some embodiments, upon determining that the price increase is less than a threshold amount (or upon determining that there has been a decrease in the price), the system may perform the action associated with the control 106A using the increased (or decreased) price without receiving or requesting further input from the user. Such a threshold amount may be stored in association with the user for whom the custom user interface control was created. In some cases, the threshold amount (or a range of values, a maximum value, a minimum value, etc.) may be one of the parameters associated with the custom user interface control. For example, if the system determines that the custom user interface control is associated with a maximum item price of $20 and that the current price of the item associated with the custom user interface control is $19, the system may place an order for the item without requesting or receiving further input from the user (e.g., based on a determination that the current price of $19 is less than the maximum item price of $20) even though the price of the item at the time the custom user interface control was created was $15.

FIG. 1C depicts an example in which "Item Y" no longer qualifies for free expedited shipping. Upon determining that "Item Y" no longer qualifies for free expedited shipping, the system may prompt the user to confirm that free standard shipping is acceptable to the user. As shown in FIG. 1C, the user may be presented selectable options for either (i) paying for expedited shipping and completing the action associated with the control 106B (e.g., placing an order of "Item Y") or (ii) completing the action with free standard shipping. Although shipping method is used as an example to illustrate a changed condition associated with the action associated with the activated control (e.g., control 106B), the techniques described herein may be extended to presentation of other options and methods relating to performance of the designated action.

FIG. 1D depicts an example in which "Item Z" is no longer available. Upon determining that "Item Z" is no longer available, the system may identify a substitute item that is similar to "Item Z" (e.g., one having the same item ID, one having the same item type, one having the same category ID, one within the same price range, one previously ordered by the user, one having the same item parameters, or other similarity), and prompt the user to confirm that the substitute item is acceptable to the user. As shown in FIG. 1D, the user may be presented selectable options for either (i) canceling the order or (ii) placing an order for the substitute item ("Item Q"). In some embodiments, upon determining that the substitute item is substantially similar to the original item to be ordered upon activation of the control (e.g., control 106C), the system may place an order for the substitute item without receiving or requesting further input from the user. For example, the system may determine that the substitute item is substantially similar to the original item based on one or more substitution rules for determining whether an item can be a substitute of another item. Such substitution rules may include (i) whether the substitute item has the same item ID and is within the same price range, (ii) whether the substitute item has the same item type and was previously ordered by the user, or (iii) whether the substitute item satisfies any other combination of factors described herein.

Different Default Actions

Figure 1F:
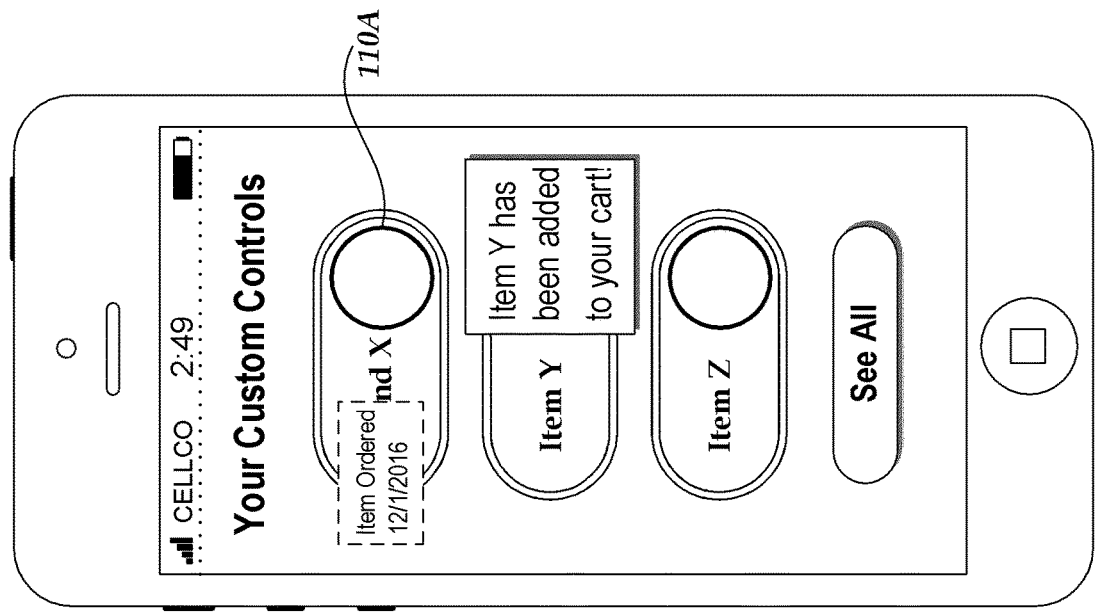
FIGS. 1E and 1F are illustrative user interfaces that depict performance of different actions upon user activation of different custom user interface controls displayed on a mobile device.
Figure 1E:
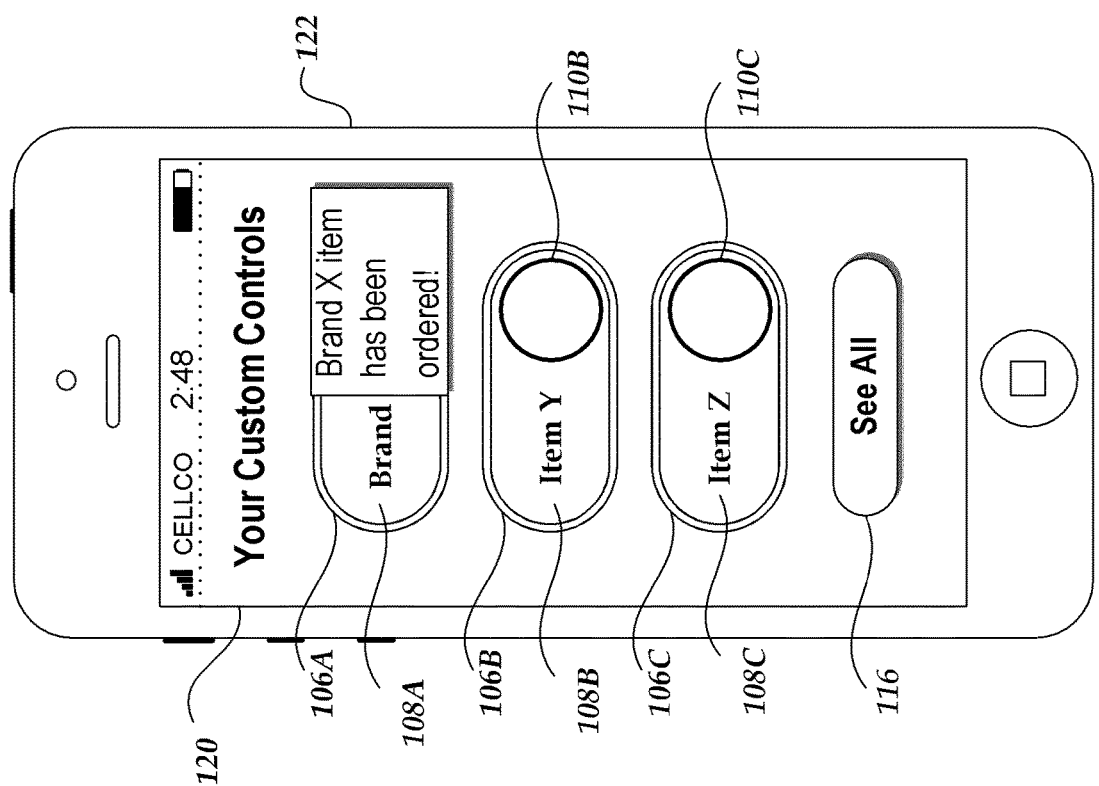

FIGS. 1E and 1F depict additional illustrative user interfaces 120 that may be generated in association with aspects of the present disclosure. The user interface 120 is displayed on a mobile computing device 122, which provides a touch-based interface to the custom user interface controls 106A-C, their respective information panels 108A-C, buttons 110A-C, and the selectable option 116 for displaying additional controls, all of which are as described with reference to FIG. 1A above. In the example of FIG. 1E, when the user activates (or selects) the control 106A, the item associated with the control 106A is automatically ordered without further input from the user, and a message indicating that the item has been ordered is displayed on the user interface 120. In the example of FIG. 1F, when the user activates (or selects) the control 106B, the item associated with the control 106B is automatically added to the shopping cart of the user, and a message indicating that the item has been added to the user's shopping cart is displayed on the user interface 120. Thus, the action associated with the control 106A (e.g., placing an order) and the action associated with the control 106B (e.g., adding to the shopping cart) are different, and the parameters associated with the control 106A (e.g., "Brand X" item, among others such as shipping method, shipping address, payment method, etc.) and the parameters associated with the control 106B (e.g., "Item Y," among others such as shipping method, shipping address, payment method, etc.) are different, even though the controls 106A and 106B are adjacent to each other on the user interface 120. The system may perform different actions based on (i) the details of user activation (e.g., when, where, how, and by whom the control is activated), (ii) the details associated with the control (e.g., item, item type, quantity, price, etc.), and/or the details of the system (e.g., current stock, current price, etc.). For example, if the item is a digital good (e.g., a song or a movie), a download option may be presented to the user. If the item is an item that cannot be (or not desirable to be) shipped by itself (e.g., due to its weight, volume, low price, etc.), the item may be added to the user's electronic shopping cart rather than automatically ordered, allowing the user time to add additional items to the shopping cart before ordering.

Custom UI Controls on External Systems

FIGS. 1G and 1H depict additional illustrative user interfaces that may be presented in association with aspects of the present disclosure. FIG. 1G shows a refrigerator 130 including a display screen 131 displaying content 132 and custom UI controls 134A-C. For example, upon user activation of such custom UI controls (e.g., by touching the custom UI control displayed on a touchscreen display), certain preconfigured actions may be performed via another system (e.g., system according to various embodiments of the present disclosure, such as server 400 of FIG. 4, which is described in greater detail below). The preconfigured action may be ordering items to be stored in the refrigerator 130. Although the refrigerator 130 is used in the example of FIG. 1G, the techniques described herein may be extended to any other third-party device (e.g., a device other than the computing system providing and maintaining the custom UI controls or other than the computing system performing the preconfigured actions associated with the custom UI controls).

FIG. 1H shows a user interface 140 presented via the display screen of a user device (e.g., desktop computer, laptop computer, tablet computer, smartphone, or other user computing device). The user interface 140 includes user interface controls 142 associated with "Site One" (e.g., the website or system that the user is currently navigating) and custom UI controls 144 associated with one or more external websites or systems that are different from "Site One." As shown in FIG. 1H, a custom UI control created and managed on a given system may be utilized on other systems to allow a user to perform the action associated with the custom UI control on the given system different from the system that the user is currently navigating and/or the system on which the user activates the custom UI control. The systems of FIGS. 1G and 1H may retrieve the custom UI controls from the system on which the custom UI controls are created and maintained (e.g., by making application programming interface calls to the system maintaining the custom UI controls), based on the identity of the user logged into the systems (e.g., "User123" in the example of FIG. 1H). For example, the system of FIG. 1H may request "Site Two" and/or "Site Three" for custom UI controls associated with the user "User123."

Custom User Interface Input Processing Routine

Figure 2:
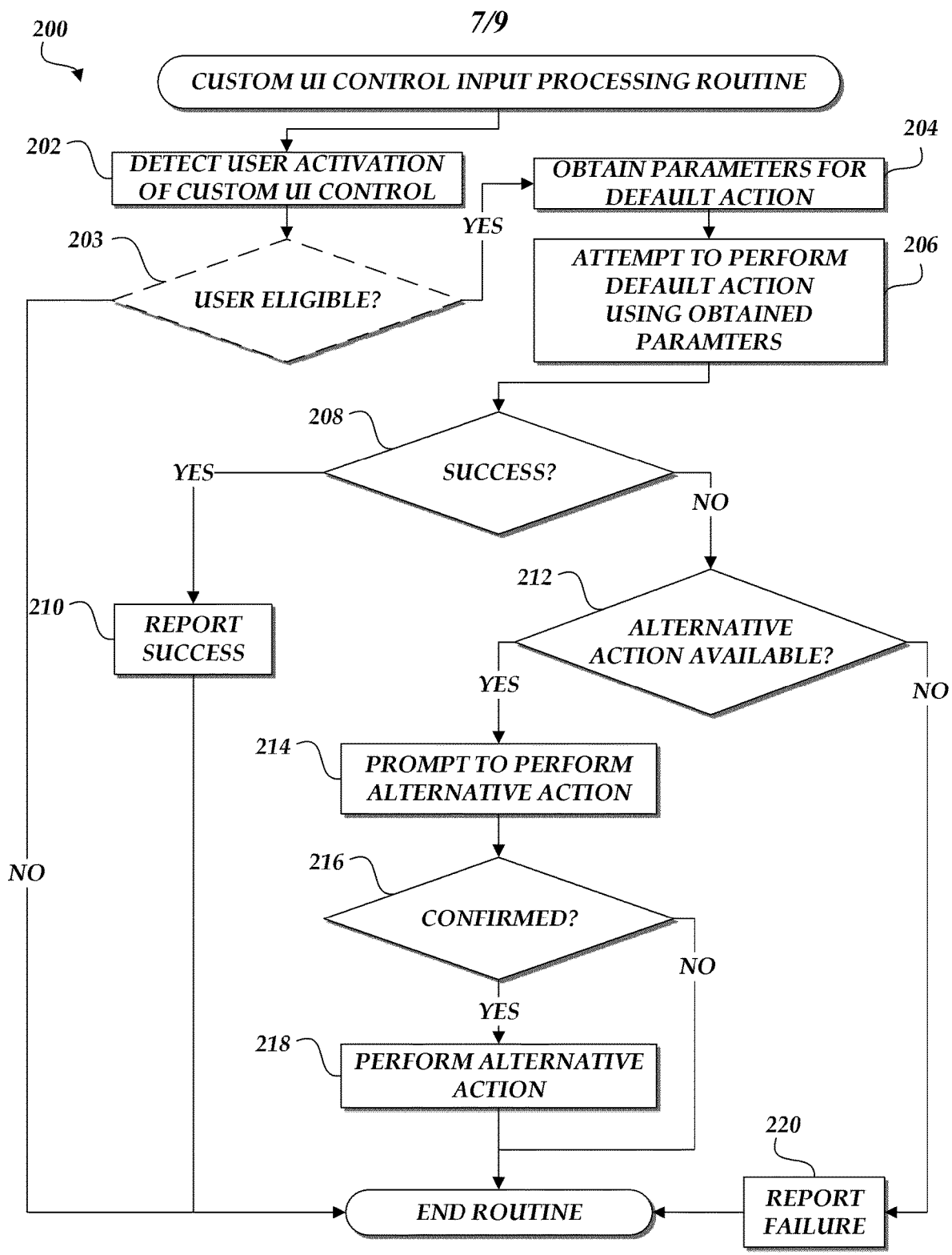
FIG. 2 is a flow diagram depicting an illustrative user-specific graphical user interface control input processing routine in accordance with aspects of the present disclosure.

With reference now to FIG. 2, an example custom UI control input processing routine 200 will be described. The example routine 200 may be carried out, for example, by the custom user interface server 400 of FIG. 4 (or one or more components thereof), which will be described below. For convenience, the steps of the example routine 200 are described as being performed by a system.

At block 202, the system detects user activation of a custom UI control. The custom UI control may be a UI button configured to trigger an item to be ordered without further user input. Such a button may be used by the user to effortlessly place an order for the designated item without having to specify further order parameters. For example, such a button may be created for an item that is frequently replenished or re-ordered. In some embodiments, a given custom UI control is associated with (i) the user for whom the custom UI control was created, (ii) an action to be performed upon user activation of the custom UI control, and (iii) a set of parameters to be used to perform the action associated with the custom UI control. Such information associated with the custom UI control may be stored in an electronic data storage system comprising one or more databases. For example, the action associated with the custom UI control may include ordering, adding to the shopping cart, downloading, etc., whereas the set of parameters may include the item to be ordered, the item quantity to be ordered, the shipping method to be used to order the item, a shipping address, the payment method to be used to order the item, etc.

In some embodiments, the user activation comprises a user clicking on the custom UI control or touching the custom UI control displayed on a touch screen (e.g., on the information panel of the control, on the button provided on the control, or any other portion of the control). In some instances, different actions may be triggered depending on which portion of the control (e.g., the location on the control) is touched, selected, or activated by the user. For example, a custom UI control may be configured or programmed to perform one action if one portion of the custom UI control is activated, selected, clicked on, or touched, and to perform another action if another portion of the custom UI control is activated, selected, clicked on, or touched. In the example of FIG. 1A, the control 106B may place an order for "Item Y" without any further user input when the user clicks on the button 110B. On the other hand, the control 106B may display the details of "Item Y" when the user clicks on the information panel 108B. Although the actions of ordering an item and displaying item details were used as examples, other actions may be performed upon user activation of various portions of the custom UI control described herein, such as toggling through different actions (e.g., ordering the item, adding the item to the user's cart, shipping the item to another person, etc.) or items (e.g., different colors of the item, different flavors of the item, different quantities of the item, different sizes of the item, etc.). In some embodiments, the action performed in response to the user activation may be determined based on the length of the user input (e.g., how long the user input continues without being interrupted) or a combination of the length and the location of the user input. In some embodiments, the user activation comprises a user providing a voice command matching a predetermined signal associated with the custom UI control. For example, the user may utter "dash detergent" into the microphone attached to a user device or another computing device, "dash" indicating that the user wishes to place an immediate order for an item, and "detergent" identifying the item that the user wishes to order. After placing such an order in response to the voice command, the system may cause a voice message to be provided via the same device including the microphone, or another mobile device of the user (e.g., via the display screen of the user's smartphone).

In some embodiments, the routine 200 may optionally include block 203, where the system determines whether the user activating the custom UI control is eligible to use the custom UI control. Such a determination may be made based on the current membership level of the user. For example, a user having a basic membership may not be allowed to use the custom UI control, whereas a user having a preferred membership may be allowed to use the custom UI control. In such an example, if the system determines that the user has a basic membership (or the preferred membership of the user has expired), although not illustrated in FIG. 2, the system may invite the user to upgrade the user's membership to the preferred membership so that the user may utilize additional features associated with the preferred membership, one of which may be the ability to create and utilize custom UI controls generally, or to fulfill the requirement of a specific UI control. For example, a given UI control may be associated with an action of ordering an item that is only available to members of a given program, membership level, or subscription service (such as an action to order grocery items that are only available to members of a grocery delivery program or service).

At block 204, the system obtains parameters for a default action associated with the custom UI control. For example, the default action may be placing an order for a designated item associated with the custom UI control, and the parameters may include the identity of the item (e.g., a box of cookies), the item quantity, the item price or price range, and/or other parameters usable for placing the order. In some embodiments, the parameters associated with the custom UI control may include one or more rules for performing the action associated with the custom UI control. For example, the parameters may specify a price range within which the item is to be ordered. The price range may be specified in absolute dollar amounts or in percentage values (e.g., relative to the price of the item). In some embodiments, the default action and the parameters are stored in a database in association with an identifier associated with the custom UI control. For example, the default action and the parameters may be a snapshot of all the parameters needed to perform the default action determined at the time the custom UI control is created. In some of such embodiments, the default action and the parameters remain static and do not depend on context information other than the identifier associated with the custom UI control. For example, the activation of a custom UI control may cause the same action to be performed using the same parameters regardless of where (e.g., regardless of which system or which page within a system) the custom UI control is displayed and/or activated. In some embodiments, the default action and the parameters are stored in association with the identifier associated with the custom UI control at the time the custom UI control is created.

At block 206, the system attempts to perform the default action using the obtained parameters. For example, when the user activates a custom UI control on a user device, the user device may send the identifier associated with the custom UI control to the system, and the system may retrieve the parameters associated with the identifier from one or more databases and cause an action to be performed based on the retrieved parameters. The parameters may include a predetermined item quantity (e.g., five boxes) and a predetermined item price or price range (e.g., under $20), and the system may attempt to order the predetermined number (e.g., five) of boxes of cookies at the predetermined item price (or under the price cap of $20). At block 208, the system determines whether the default action was successfully performed. For example, the default action may not be performed successfully if the number of boxes of cookies in stock is less than five or if the price of the box of cookies has changed (or increased, or increased by more than a threshold amount). In another example, if the system determines that the current price of the box of cookies is outside the price range (e.g., greater than $20 as specified by the parameters associated with the custom UI control), the system may determine that the default action cannot be (or was not) successfully performed. In some embodiments, based on a determination that the current price of the box of cookies is within a threshold amount (e.g., dollar value or percentage value) from the price range (e.g., $21), the system may cause the box of cookies to be ordered at a price that is within the price range (e.g., by capping the current price of the box of cookies at the maximum value within the price range, $20), so as to allow the default action to be performed successfully. In some cases, based on how frequently the custom UI control has been activated, the price of the current order may be reduced by a specific amount (e.g., $5 off, 5% off, or any other amount). Alternatively, such a discount based on the frequency of use may be added to the user's account but not used for the current order. In some cases, upon user activation of the custom UI control, if the system determines that the user is eligible for such a discount, the user may be presented with an option to apply the discount towards the current order. Although the item quantity and the item price range were used as example control parameters, other characteristics of the item or other parameters may be used to determine whether or not the default action can be (or will be) performed.

If the system determines that the default action was successfully performed, the routine 200 proceeds to block 210, where the system reports the successful performance of the default action associated with the custom UI control. For example, the system may cause a message to be displayed to the user indicating that the order has been placed, as shown in FIG. 1E. Otherwise, the routine 200 proceeds to block 212, where the system determines whether an alternative action can be performed instead of the default action. For example, the alternative action may include ordering the item at a different price, ordering a different quantity of the item, ordering a different item, adding the item to the user's shopping cart without completing the order, etc. If the system determines that an alternative action can be performed, the routine 200 proceeds to block 214, where the system prompts the user to confirm that the alternative action is acceptable to the user. For example, the system may cause selectable options to be displayed to the user, as illustrated in FIGS. 1B-D. Upon receiving an indication that the alternative action is acceptable to the user, the routine 200 proceeds to block 218, where the system performs the alternative action. Otherwise, block 218 is skipped, and the routine 200 ends. At block 212, if the system determines that there is no alternative action that can be performed instead of the default action, the routine 200 proceeds to block 220, where the system reports to the user that the requested action could not be successfully performed. After such reporting, the routine 200 ends.

It will be understood that the blocks of the routine 200 may be combined, divided, or varied within the scope of the present disclosure. For example, blocks 214 and 216 may be omitted. In another example, subsequent to performing an action, the system may cause a status indicator indicative of whether the action has been performed to be displayed on the display screen of the user's device (e.g., as illustrated in the examples of FIGS. 1E and 1F). Such a status indicator may overlap with the custom UI control triggering the performed action. In some embodiments, such a status indicator may be displayed on a different device (e.g., a device other than the one from which the custom UI control is activated). For example, the user may activate a custom UI control displayed on the user's refrigerator to place an order for a bag of carrots, and in response to the activation, the user's smartphone may display a status indicator indicating that the bag of carrots has been ordered. The status indicator may be displayed on all the devices configured to display the activated UI control (e.g., both the refrigerator and the smartphone). As further examples, instead of attempting to perform the default action at block 206, the system may determine whether one or more selection rules are satisfied, and select an appropriate action to be performed based on which one of the selection rules is satisfied. As discussed above, the system may perform different actions based on (i) the details of user activation (e.g., when, where, how, and by whom the control is activated), (ii) the details associated with the control (e.g., item, item type, quantity, price, etc.), and the details of the system (e.g., current stock, current price, etc.). Alternatively, the system may perform the same action based on the identity of the activated custom UI control, regardless of the context in which the custom UI control is activated (e.g., when, where, how, by whom the control is activated).

Alternative Action Determination Routine

Figure 3:
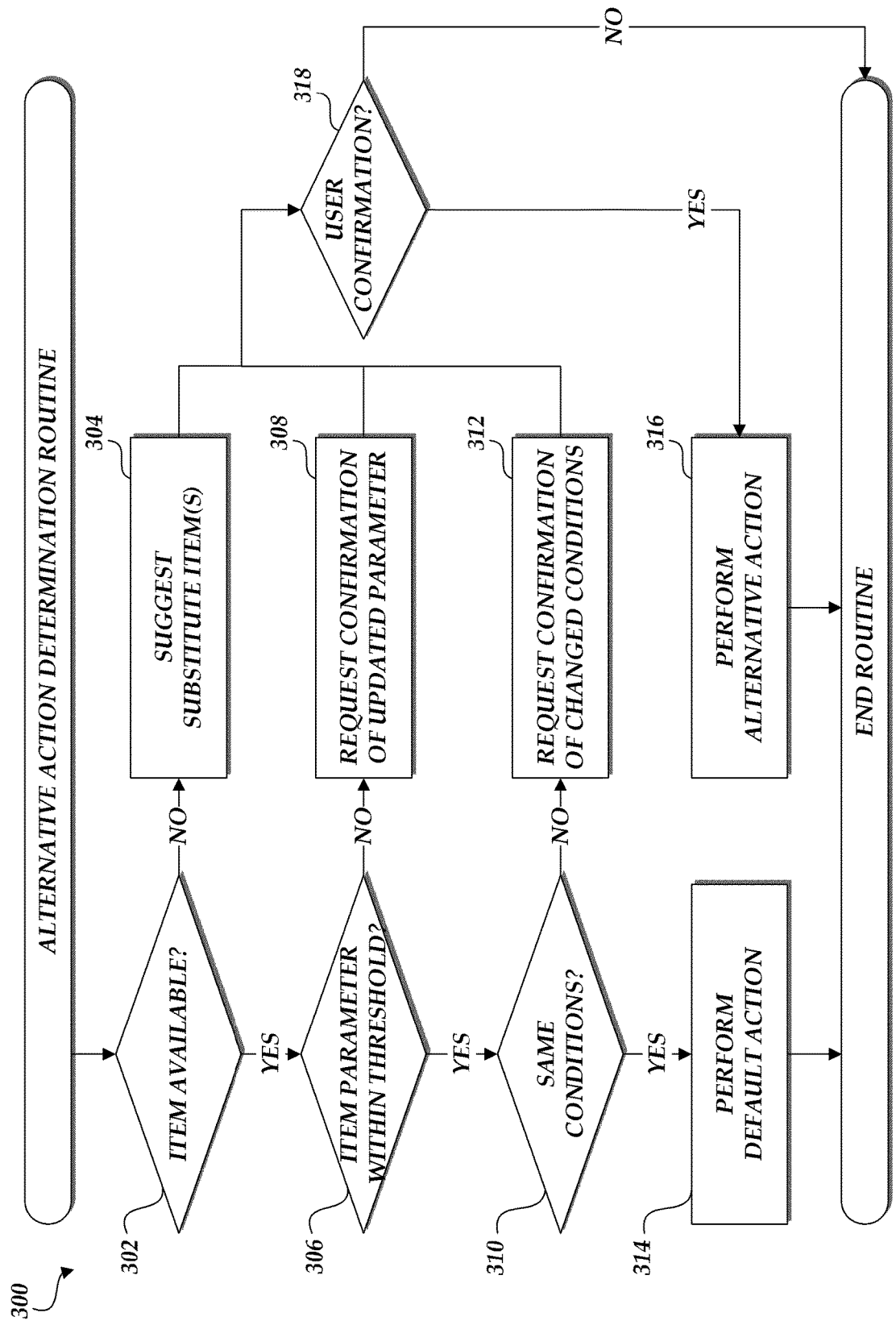
FIG. 3 is a flow diagram depicting an illustrative alternative action determination routine in accordance with aspects of the present disclosure.

Turning now to FIG. 3, an example routine 300 for determining alternative actions for custom UI controls will be described. The example routine 300 may be carried out, for example, by the custom user interface server 400 of FIG. 4 (or one or more components thereof). For convenience, the steps of the example routine 300 are described as being performed by a system.

At block 302, the system determines whether an item associated with the custom UI control activated by the user is available to be ordered. If the system determines that the item is available to be ordered, the routine 300 proceeds to block 306. Otherwise, the routine 300 proceeds to block 304, where the system determines one or more substitute items that can be ordered instead of the item, and requests confirmation from the user that one of the one or more substitute items is acceptable to the user. In some embodiments, the system identifies a substitute item that may be used instead of the item associated with the custom UI control using one or more substitution rules. Such substitute rules may specify one or more conditions under which an item can be a substitute for another item (e.g., must be within the same price range, must have the same item type, must be within the same item category, must have the same quantity available in stock, must have been previously ordered by the user, must be within the same brand category, and/or other conditions). For example, the item may be a "Brand X" detergent and the "Brand X" detergent may be out of stock, whereas a "Brand Y" detergent within a similar price range may be in stock. In such an example, the system may request confirmation from the user that "Brand Y" detergent is acceptable to the user. In another embodiment, the item may be "Brand X" detergent in a given size (e.g., 32 ounces), and the substitute item may be "Brand X" detergent in a different size (e.g., 24 ounces). Substitute items may be determined in a number of ways, such as by comparing item attributes between items (e.g., category, brand, size, flavor, manufacturer, color, weight, dimensions, release date, etc.) and/or analyzing user behavior (e.g., users' browse history, order history, etc.). Upon receiving the user confirmation at block 318, the routine 300 proceeds to block 316, where the system performs an alternative action (e.g., ordering of the substitute item approved by the user). After performing the alternative action, the routine 300 ends.

At block 306, the system determines whether a difference between the parameters associated with the custom UI control and the item parameters (e.g., price, availability, etc.)

associated with the item is within a threshold. For example, the parameters associated with the custom UI control may include an item price (e.g., the original price for which the custom UI control is configured to place an order for the item) that may differ from the current price of the item (e.g., due to a price increase since the creation of the custom UI control). In such an example, the system may calculate a price difference between the item price associated with the custom UI control and the current price of the item and determine whether the price difference is within a threshold amount (e.g., a predetermined dollar amount or a predetermined percentage of the original price or the current price). As another example, the parameter may be a delivery date estimate (e.g., that based on in stock status and warehouse location, the item can be delivered in two days, three days, a week, etc.).

If the system determines that the difference between the parameters associated with the custom UI control and the parameters associated with the item (e.g., price difference or difference in other characteristics of the item such as quantity, color, type, shape, etc.) is within the threshold, the routine 300 proceeds to block 310. Otherwise, the routine 300 proceeds to block 308, where the system requests confirmation from the user that the difference is acceptable to the user. For example, the system may request confirmation from the user that a given price increase is acceptable to the user. Upon receiving the user confirmation at block 318, the routine 300 proceeds to block 316, where the system performs an alternative action (e.g., ordering of the item at the current price approved by the user). After performing the alternative action, the routine 300 ends.

At block 310, the system determines whether one or more conditions have remained the same since the creation of the custom UI control. For example, the default shipping method for the item associated with the custom UI control may have changed from free expedited shipping to free standard shipping. This could occur, for instance, if the item no longer qualifies for a promotion or subscription shipping plan in effect at the time that the custom UI control was created. In another example, the shipping address or payment method of the user may have changed. If the system determines that the conditions have remained the same since the creation of the custom UI control, the routine 300 proceeds to block 314, where the system performs the default action associated with the custom UI control. After the system performs a default action, the routine 300 ends.

At block 310, if the system determines that one or more of the conditions have changed since the creation of the custom UI control, the routine 300 proceeds to block 312, where the system requests confirmation from the user that the changed conditions are acceptable to the user. Upon receiving the user confirmation at block 318, the routine 300 proceeds to block 316, where the system performs an alternative action (e.g., ordering of the item using the changed shipping method, changed payment method, changed shipping address, and/or other changed parameters). After performing the alternative action, the routine 300 ends.

It will be understood that the blocks of the routine 300 may be combined, divided, or varied within the scope of the present disclosure. For example, any of (i) blocks 302 and 304, (ii) blocks 306 and 308, (iii) blocks 310 and 312, and combinations thereof may be omitted. As another example, instead of requesting user confirmation at blocks 304, 308, and 312, the system may determine whether a condition for proceeding with the alternative action without requesting or receiving user confirmation is satisfied, and based on a determination that the condition is satisfied, perform the alternative action without requesting and receiving user confirmation. In some embodiments, the system may determine whether a selection rule for selecting the appropriate action and the appropriate set of parameters to be used to perform the action is satisfied by one or more control parameters associated with the custom UI control. For example, if the system determines that the item type (e.g., indicated by the one or more control parameters associated with the custom UI control) is a grocery item, the system may select the action of adding the item to the shopping cart rather than placing an order for the item. In another example, if the item type is a music file, the system may select the action of downloading the item rather than adding the item to the shopping cart.

Example Network Environment of Custom User Interface Server

Figure 4:
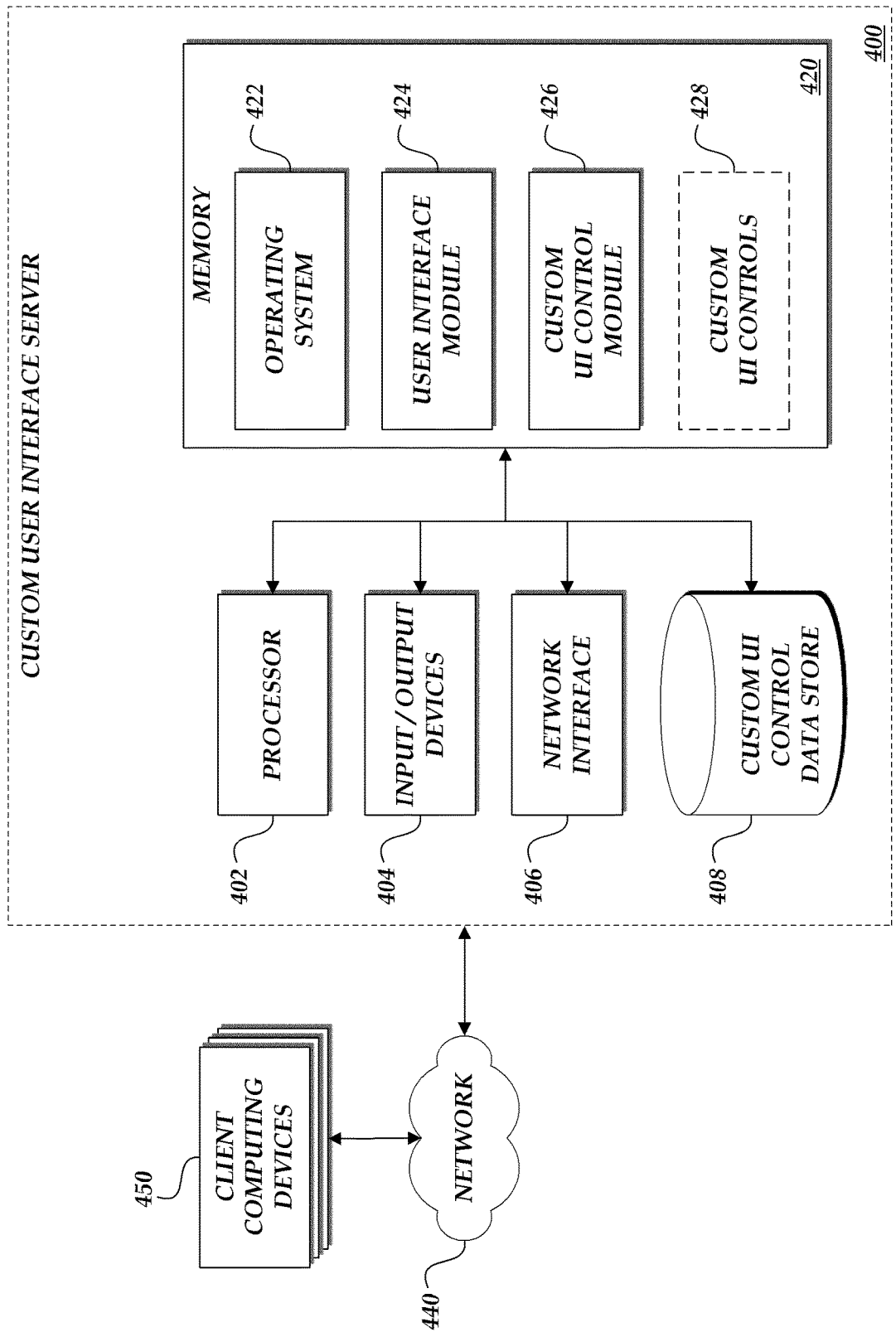
FIG. 4 is an illustrative network topology depicting a general architecture of an example computing device configured to implement aspects of the present disclosure.

FIG. 4 depicts a network topology including client computing devices 450, a network 440, and a general architecture of a custom user interface server 400, which includes an arrangement of computer hardware and software components that may be used to implement aspects of the present disclosure. The network topology and the custom user interface server 400 may include many more (or fewer) elements than those shown in FIG. 4. It is not necessary, however, that all of these elements be shown in order to provide an enabling disclosure.

As illustrated, the custom user interface server 400 includes a processor 402, input/output devices 404, a network interface 406, and a data store 408, all of which may communicate with one another by way of a communication bus. The network interface 406 may provide connectivity to one or more networks (such as network 440) or computing systems and, as a result, may enable the custom user interface server 400 to receive and send information and instructions from and to other computing systems or services.

The processor 402 may also communicate to and from a memory 420. The memory 420 may contain computer program instructions (grouped as modules or components in some embodiments) that the processor 402 may execute in order to implement one or more embodiments of the present disclosure. The memory 420 generally includes RAM, ROM, and/or other persistent, auxiliary, or non-transitory computer-readable media. The memory 420 may store an operating system 422 that provides computer program instructions for use by the processor 402 in the general administration and operation of the custom user interface server 400. The memory 420 may further store specific computer-executable instructions and other information (which may be referred to herein as "modules") for implementing aspects of the present disclosure. For example, the memory 420 may include a user interface module 424, which may perform various operations with regard to displaying the user interfaces described herein. For example, the user interface module 424 may store and retrieve templates for user interfaces that specify a number and placement of custom UI controls.

In some embodiments, the memory 420 may include a custom UI control module 426, which may be executed by the processor 402 to perform various operations, such as those operations described with reference to FIGS. 2 and 3. The memory 420 may further include custom UI controls 428 that are loaded into the memory 420 as various operations are performed.

While the operating system 422, the user interface module 424, and the custom UI control module 426 are illustrated as distinct modules in the memory 420, in some embodiments, the user interface module 424 and the custom UI control module 426 may be incorporated as modules in the operating system 422 or another application or module, and as such, separate modules may not be required to implement some embodiments. In some embodiments, the user interface module 424 and the custom UI control module 426 may be implemented as parts of a single application.

It will be recognized that many of the devices described above are optional and that embodiments of the custom user interface server 400 may or may not combine devices. Furthermore, devices need not be distinct or discrete. Devices may also be reorganized. For example, the custom user interface server 400 may be implemented using a single physical device or, alternatively, may be implemented in a distributed manner across multiple physical devices. In some embodiments, components illustrated as part of the custom user interface server 400 (such as custom UI control module 426) may additionally or alternatively be included in the client computing devices 450, such that some aspects of the present disclosure may be performed by the custom user interface server 400 while other aspects are performed by a client computing device.

Other Considerations

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a", "an", or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be implemented within a form that does not provide all of the features and benefits set forth herein, as some features can be used or practiced separately from others. All such modifications and variations are intended to be included herein within the scope of this disclosure and protected by the following claims.

What is claimed is:

1. A computer-implemented method for performing actions based on user activation of custom user interface controls, the method comprising:
as implemented by one or more computing devices configured with specific executable instructions,
detecting user activation of a first custom user interface control configured to trigger, upon user activation, a first action to be performed using one or more first parameters, wherein the first action comprises placing an order for an item, wherein the first custom user interface control is associated with a first item identifier for the item and one or more control parameters for the order to be placed, wherein the one or more control parameters include an original item price associated with the item, the original item price being defined at a first time at which the first custom user interface control is configured;
determining, based at least in part on the first item identifier associated with the first custom user interface control, that the item having the first item identifier is available to be ordered;
determining one or more item parameters associated with the item having the first item identifier as available to be ordered, wherein the one or more item parameters indicate at least a current item price associated with the item that is in stock at a second time at which the one or more item parameters are determined, wherein the second time is subsequent to the first time;
determining, based at least in part on the current item price conflicting with the original item price associated with the first custom user interface control, that the order for the item cannot be placed at the original item price;
based at least in part on the determination that the order for the item cannot be placed at the original item price, determining that a difference between the original item price and the current item price of the item associated with the first custom user interface control does not exceed a threshold amount associated with the first custom user interface control; and
causing an alternative action to be performed without receiving or requesting further user input subsequent to the user activation of the first custom user interface control, wherein the alternative action comprises placing an order for the item associated with the first custom user interface control using at least the one or more item parameters associated with the item despite the current item price conflicting with the original item price associated with the first custom user interface control.

2. The method of claim 1, further comprising determining that the item associated with the first custom user interface control is no longer available to be ordered at a quantity specified by the one or more control parameters, and causing the order for the item to be placed at a quantity lower than the quantity specified by the one or more control parameters.

3. The method of claim 1, wherein the one or more control parameters include a first shipping method, the method further comprising determining that the item associated with the first custom user interface control is no longer eligible for the first shipping method, and causing the order for the item to be placed using a second shipping method different from the first shipping method.

4. The method of claim 1, further comprising:
subsequent to causing the alternative action to be performed, detecting another user activation of the first custom user interface control; and
based on a determination that the first action can be performed using the one or more control parameters, causing the first action to be performed without receiving or requesting further user input.

5. The method of claim 1, further comprising:
causing a second custom user interface control to be presented adjacent to the first custom user interface control, the second custom user interface control configured to trigger, upon user activation, a second action to be performed using one or more second parameters;
subsequent to causing the alternative action to be performed, detecting user activation of the second custom user interface control; and
causing the second action to be performed without requesting or receiving further user input.

6. The method of claim 1, wherein the user activation comprises a user input received at a first portion of the first custom user interface control, the method further comprising causing the first action to be performed based on a determination that the user input was received at the first portion of the first custom user interface control.

7. The method of claim 6, further comprising causing another action different from the first action to be performed based on a determination that another user input was received at a second portion of the first custom user interface control different from the first portion.

8. A system for performing actions based on user activation of custom user interface controls, the system comprising:
a computing system comprising one or more hardware computing devices executing specific computer-executable instructions, wherein the computing system is configured to at least:

detect user activation of a first custom user interface control configured to trigger, upon user activation, a first action to be performed using one or more first parameters, wherein the first action comprises placing an order for an item, wherein the first custom user interface control is associated with a first item identifier for the item and one or more control parameters for the order to be placed, wherein the one or more control parameters include an original item price associated with the item, the original item price being defined at a first time at which the first custom user interface control is configured;

determine, based at least in part on the first item identifier associated with the first custom user interface control, that the item having the first item identifier is available to be ordered;

determine one or more item parameters associated with the item having the first item identifier as available to be ordered, wherein the one or more item parameters indicate at least a current item price associated with the item that is in stock at a second time at which the one or more item parameters are determined, wherein the second time is subsequent to the first time;

determine, based at least in part on the current item price conflicting with the original item price associated with the first custom user interface control, that the order for the item cannot be placed at the original item price;

based at least in part on the determination that the order for the item cannot be placed at the original item price, determine that a difference between the original item price and the current item price of the item associated with the first custom user interface control does not exceed a threshold amount associated with the first custom user interface control; and cause an alternative action to be performed without receiving or requesting further user input subsequent to the user activation of the first custom user interface control, wherein the alternative action comprises placing an order for the item associated with the first custom user interface control using at least the one or more item parameters associated with the item despite the current item price conflicting with the original item price associated with the first custom user interface control.

9. The system of claim 8, wherein the computing system is further configured to:

subsequent to causing the alternative action to be performed, detect another user activation of the first custom user interface control; and based on a determination that the first action can be performed using the one or more control parameters, cause the first action to be performed without receiving or requesting further user input.

10. The system of claim 8, wherein the computing system is further configured to:

cause a second custom user interface control to be presented adjacent to the first custom user interface control, the second custom user interface control configured to trigger, upon user activation, a second action to be performed using one or more second parameters;

subsequent to causing the alternative action to be performed, detect user activation of the second custom user interface control; and cause the second action to be performed without requesting or receiving further user input.

11. The system of claim 8, wherein the user activation comprises a user input received at a first portion of the first custom user interface control, the computing system being further configured to cause the first action to be performed based on a determination that the user input was received at the first portion of the first custom user interface control.

12. The system of claim 11, wherein the computing system is further configured to cause another action different from the first action to be performed based on a determination that another user input was received at a second portion of the first custom user interface control different from the first portion.

13. A non-transitory physical computer storage medium storing computer-executable instructions that, when executed by one or more processors, configure the one or more processors to:

detect user activation of a first custom user interface control configured to trigger, upon user activation, a first action to be performed using one or more first parameters, wherein the first action comprises placing an order for an item, wherein the first custom user interface control is associated with a first item identifier for the item and one or more control parameters for the order to be placed, wherein the one or more control parameters include an original item price associated with the item, the original item price being defined at a first time at which the first custom user interface control is configured;

determine, based at least in part on the first item identifier associated with the first custom user interface control, that the item having the first item identifier is available to be ordered;

determine one or more item parameters associated with the item having the first item identifier as available to be ordered, wherein the one or more item parameters indicate at least a current item price associated with the item that is in stock at a second time at which the one or more item parameters are determined, wherein the second time is subsequent to the first time;

determine, based at least in part on the current item price conflicting with the original item price associated with the first custom user interface control, that the order for the item cannot be placed at the original item price;

based at least in part on the determination that the order for the item cannot be placed at the original item price, determine that a difference between the original item price and the current item price of the item associated with the first custom user interface control does not exceed a threshold amount associated with the first custom user interface control; and cause an alternative action to be performed without receiving or requesting further user input subsequent to the user activation of the first custom user interface control, wherein the alternative action comprises placing an order for the item associated with the first custom user interface control using at least the one or more item parameters associated with the item despite the current item price conflicting with the original item price associated with the first custom user interface control.

14. The non-transitory physical computer storage medium of claim 13, wherein the instructions, when executed by the one or more processors, further configure the one or more processors to determine that the item associated with the first custom user interface control is no longer available to be ordered at a quantity specified by the one or more control parameters, and cause the order for the item to be placed at a quantity lower than the quantity specified by the one or more control parameters.

15. The non-transitory physical computer storage medium of claim 13, wherein the one or more first parameters include a first shipping method, the instructions, when executed by the one or more processors, further configuring the one or more processors to determine that the item associated with the first custom user interface control is no longer eligible for the first shipping method, and cause the order for the item to be placed using a second shipping method different from the first shipping method.

* * * * *